United States Patent Office 2,841,610
Patented July 1, 1958

2,841,610

ESTERS OF ARYL-SUBSTITUTED CYCLOBUTANE-DICARBOXYLIC ACIDS

William A. Lott, Maplewood, N. J., assignor to Olin Mathieson Chemical Corporation, New York, N. Y., a corporation of Virginia No Drawing. Application August 12, 1955
Serial No. 528,123

3 Claims. (Cl. 260—475)

This invention relates to new diaryl-substituted cyclobutane-carboxylic acid esters of amino substituted alkanols, which are of value as local anesthetics, being characterized by rapid induction and long duration of action, especially when administered parenterally.

The new compounds of this invention may be represented by the general formula:

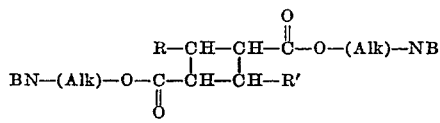

wherein R and R' represent aromatic monocarbocyclic radicals, such as phenyl, (lower alkyl)-substituted phenyl (e. g. tolyl, xylyl, and ethylphenyl), (lower alkoxy)-substituted phenyl (e. g. anisyl, phenetyl, dimethoxyphenyl, diethoxyphenyl, and trimethoxyphenyl), aminophenyl, halophenyl (e. g. chlorophenyl and bromophenyl), and nitrophenyl; Alk is a lower alkylene, which may be straight or branched; and NB is an amino radical, such as amino, (lower alkyl)-amino (e. g. methylamino, ethylamino, and propylamino), di(lower alkyl)-amino (e. g. dimethylamino, diethylamino, dipropylamino, and methylpropylamino), and saturated N-heterocyclic (e. g. piperidino, pyrrolidino, and morpholino). Of particular advantage are those compounds wherein R and R' are unsubstituted phenyl, and Alk is a lower alkylene of 2 to 4 carbon atoms. The new compounds may be obtained as free bases or acid-addition salts, and either of these forms may be converted to the other in the conventional manner.

The new compounds are readily prepared by reacting an acid of the formula

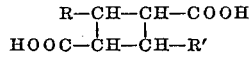

wherein R and R' are as hereinbefore defined, with an aminoalkyl halide of the formula NB—(Alk)—X (preferably in approximately 1:2 molar ratio), wherein X is halogen, and preferably chlorine. The reaction is advantageously carried out in an inert solvent such as a liquid alcohol (e. g. a lower alkanol, as exemplified by isopropanol), preferably at an elevated temperature (e. g. at reflux).

The esters of this invention are generally recovered in the form of their acid-addition salts with the hydrohalide (e. g. hydrochloride) of the aminoalkyl halide reactant. However, salts with other acids forming addition salts with amines may be prepared by converting the hydrohalide salt to the free base by treatment with a basic reagent such as potassium carbonate, and subsequent reaction of the free base with the desired acid (e. g. boric, nitric, lactic, tartaric, citric, phosphoric, sulfuric, or picric acid, a non-toxic acid being employed when the salt is to be the final compound).

The following examples are illustrative of the invention:

EXAMPLE 1

Preparation of 2,4-diphenyl-1-3-cyclobutanedicarboxylic acid diester with 2-diethylaminoethanol, dihydrochloride.

Forty-six grams of α-truxillic acid [J. Am. Chem. Soc., 65, 1845 (1943)] is suspended in 1200 ml. isopropyl alcohol and 41 grams diethylaminoethyl chloride is added over a 1 hour period at 35° C. The solution is refluxed for 8 hours. The isopropyl alcohol is removed under reduced pressure and the residue triturated with acetone. The solid is filtered and recrystallized from a mixture of 200 ml. acetonitrile and 600 ml. ether to give a white crystalline material melting at about 157–158° C.

EXAMPLE 2

Preparation of 2,4-diphenyl-1,3-cyclobutanedicarboxylic acid diester with 2-piperidinoethanol, dihydrochloride By substituting 45 grams of piperidinoethyl chloride for the diethylaminoethyl chloride in the procedure of Example 1, the 2,4-diphenyl-1,3-cyclobutanedicarboxylic acid diester with 2-piperidinoethanol, dihydrochloride, is prepared.

EXAMPLE 3

Preparation of 2,4-diphenyl-1,3-cyclobutanedicarboxylic acid diester with 2-ethylaminoethanol, dihydrochloride By substituting 39 grams of ethylaminoethyl chloride for the diethylaminoethylchloride in the procedure of Example 1, the 2,4-diphenyl-1,3-cyclobutanedicarboxylic acid diester with 2-ethylaminoethanol, dihydrochloride, is prepared.

The invention may be otherwise variously embodied within the scope of the appended claims.

I claim:
1. A compound selected from the group consisting of free bases of the general formula

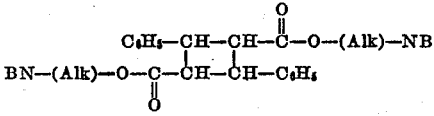

wherein Alk is a lower alkylene, and NB is selected from the group consisting of secondary and tertiary amino radicals; and the acid-addition salts thereof.

2. An acid-addition salt of the diester of α-truxillic acid and a di-(lower alkyl)-amino-lower alkanol.

3. An acid-addition salt of the diester of α-truxillic acid and 2-diethylaminoethanol.

References Cited in the file of this patent

UNITED STATES PATENTS 2,313,016   Horenstein et al. _____ Mar. 2, 1943
2,456,555   Cope _____ Dec. 14, 1948